(12) United States Patent
Shimo

(10) Patent No.: US 10,240,794 B2
(45) Date of Patent: Mar. 26, 2019

(54) THERMAL AND THRUST MANAGEMENT IN DYNAMIC PRESSURE EXCHANGERS

(71) Applicant: Rolls-Royce Corporation, Indianapolis, IN (US)

(72) Inventor: Masayoshi Shimo, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 473 days.

(21) Appl. No.: 15/041,492

(22) Filed: Feb. 11, 2016

(65) Prior Publication Data

US 2017/0234540 A1     Aug. 17, 2017

(51) Int. Cl.
| | | |
|---|---|---|
| *F23R 3/28* | (2006.01) | |
| *F23R 3/00* | (2006.01) | |
| *F02C 7/264* | (2006.01) | |
| *F23D 11/38* | (2006.01) | |
| *F23D 11/42* | (2006.01) | |
| *F23R 3/38* | (2006.01) | |
| *F23R 3/42* | (2006.01) | |
| *F04F 13/00* | (2009.01) | |
| *F23R 3/56* | (2006.01) | |
| *F23R 7/00* | (2006.01) | |

(52) U.S. Cl.
CPC ............. *F23R 3/286* (2013.01); *F02C 7/264* (2013.01); *F04F 13/00* (2013.01); *F23D 11/38* (2013.01); *F23D 11/42* (2013.01); *F23R 3/38* (2013.01); *F23R 3/42* (2013.01); *F23R 3/56* (2013.01); *F23R 7/00* (2013.01)

(58) Field of Classification Search
CPC .. F23R 3/286; F23R 3/005; F23R 3/42; F23R 3/38; F23R 3/56; F02C 7/264; F04F 13/00
See application file for complete search history.

(56) References Cited

U.S. PATENT DOCUMENTS

| | | |
|---|---|---|
| 2,853,853 A | 9/1958 | Ford |
| 3,234,736 A | 2/1966 | Dudley |
| 3,417,564 A * | 12/1968 | Call .......................... F02C 5/12 60/248 |
| 5,267,432 A | 12/1993 | Paxson |
| 5,537,973 A | 7/1996 | Wittry |
| 5,960,625 A | 10/1999 | Zdvorak et al. |
| 6,158,422 A | 12/2000 | Otto et al. |

(Continued)

FOREIGN PATENT DOCUMENTS

| | | |
|---|---|---|
| WO | 2000/068566 A2 | 11/2000 |
| WO | 2002/004794 A2 | 1/2002 |

OTHER PUBLICATIONS

Extended European Search Report, European Application No. 17152253.5-1616, dated Jul. 11, 2017, 9 pages.

(Continued)

*Primary Examiner* — William H Rodriguez
*Assistant Examiner* — Marcos O Diaz
(74) *Attorney, Agent, or Firm* — Barnes & Thornburg LLP

(57) ABSTRACT

A dynamic pressure exchanger configured for a combustion process includes an inlet plate and a rotor assembly mounted for rotation relative to the inlet plate about a central axis of the dynamic pressure exchanger. The inlet plate is formed to include an inlet port configured to direct air into the rotor assembly. The rotor assembly includes an inner rotor and an outer rotor arranged around the inner rotor.

18 Claims, 6 Drawing Sheets

(56) References Cited

U.S. PATENT DOCUMENTS

| | | |
|---|---|---|
| 6,460,342 B1 | 10/2002 | Nalim |
| 7,100,360 B2 | 9/2006 | Sammann et al. |
| 7,621,118 B2 | 11/2009 | Snyder et al. |
| 7,637,243 B2 | 12/2009 | Qamhiyeh |
| 2007/0006567 A1 | 1/2007 | Matovich |

OTHER PUBLICATIONS

Akbari, A. Nalim R., and Mueller, N., "A Review of Wave Rotor Technology and Its Applications", pp. 717-735.
Snyder, P.H., Nalim, M.R., and Alparslan, B., "Gas Dynamic Analysis of the CVC, a Novel Detonation Cycle", AIAA2002-4069, 2002, pp. 1-11.
Shimo, M. and Heister, S., "Performance Characterization and Schlieren Visualization of Flame Acceleration in Valveless Pulsed Detonation Combustors", AIAA2007-5077, 2007, pp. 1-27.

* cited by examiner

THERMAL AND THRUST MANAGEMENT IN DYNAMIC PRESSURE EXCHANGERS

FIELD OF THE DISCLOSURE

The present disclosure relates generally to dynamic pressure exchangers, and more specifically to dynamic pressure exchangers having thermal and thrust management features.

BACKGROUND

Typical dynamic pressure exchangers may be configured for constant volume combustion. Some such dynamic pressure exchangers can include an inlet plate, an outlet plate spaced apart from the inlet plate along a central axis of the dynamic pressure exchanger, and a rotor drum positioned between the plates. The inlet plate provides an inlet port through which a flow of air and fuel pass into rotor passages formed in the rotor drum. The rotor drum receives and combusts the fuel-air mixture to produce hot high-pressure products as the rotor drum rotates about the central axis. The outlet plate provides an outlet port for the hot high-pressure products to exit the dynamic pressure exchanger.

Dynamic pressure exchangers can be used in gas turbine engines. In one example, dynamic pressure exchangers can provide at least part of a combustor used in a gas turbine engine. Such a dynamic pressure exchanger may receive compressed air from a compressor, may receive fuel from a fuel system, and may deliver combustion products to a turbine. However, dynamic pressure exchangers may be used in other suitable applications.

SUMMARY

The present disclosure may comprise one or more of the following features and combinations thereof.

A dynamic pressure exchanger may include an inlet plate, a double rotor assembly, a first ignition source, and a second ignition source. The inlet plate may be formed to include an inner inlet port that extends circumferentially along a first arc about a central axis of the dynamic pressure exchanger and an outer inlet port that extends along a second arc about the central axis. The outer inlet port may be circumferentially offset from the inner inlet port and spaced radially further from the central axis than the inner inlet port.

The double rotor assembly may be mounted for rotation relative to the inlet plate about the central axis. The double rotor assembly may include an inner rotor and an outer rotor. The inner rotor may be formed to include a plurality of axially-extending inner combustion cells arranged adjacent to one another circumferentially around the central axis to align with the inner inlet port at predetermined intervals when the double rotor assembly rotates about the central axis. The outer rotor may be arranged circumferentially around the inner rotor and formed to include a plurality of axially-extending outer combustion cells arranged adjacent to one another circumferentially around the central axis to align with the outer inlet port at predetermined intervals when the double rotor assembly rotates about the central axis.

The first ignition source may be configured to ignite a first fuel mixture in an inner combustion cell aligned at a first angular position relative to the central axis. The second ignition source may be configured to ignite a second fuel mixture in an outer combustion cell aligned at a second angular position relative to the central axis. The second angular position may be offset circumferentially from the first angular position to cause a first combustion process of the inner rotor to be out of phase with a second combustion process of the outer rotor to allow heat generated in hot combustion zones of the inner and outer rotors to be transferred to cool inlet zones of the inner and outer rotors during operation of the dynamic pressure exchanger.

In some embodiments, the double rotor assembly may include an inner tube, an intermediate tube, an outer tube, a plurality of axially-extending inner webs, and a plurality of axially-extending outer webs. The intermediate tube may be arranged circumferentially around the inner tube. The outer tube may be arranged circumferentially around the intermediate tube. The plurality of axially-extending inner webs may be located radially between the inner and intermediate tubes to define the inner combustion cells. The plurality of axially-extending outer webs may be located radially between the intermediate and outer tubes to define the outer combustion cells.

In some embodiments, the inner rotor may include an outwardly-facing first surface, an inwardly-facing second surface arranged radially-outward of the first surface to face the first surface, and a plurality of inner webs that extend radially between the first and second surfaces to define the inner combustion cells. The outer rotor may include an outwardly-facing third surface, an inwardly-facing fourth surface, and a plurality of outer webs that extend radially between the third and fourth surfaces to define the outer combustion cells. The inwardly-facing fourth surface may be arranged radially-outward of the third surface to face the third surface. The double rotor assembly may further include a high thermal-conductivity body extending between the second and third surfaces.

In some embodiments, the dynamic pressure exchanger may include an outlet plate. The outlet plate may be formed to include an inner outlet port that extends circumferentially along a third arc about the central axis and an outer outlet port that extends circumferentially along a fourth arc of the central axis. The outer outlet port may be circumferentially offset from the inner outlet port and spaced radially further from the central axis than the inner outlet port.

In some embodiments, the first ignition source may include a first spark ignitor coupled to the outlet plate. In some embodiments, the second ignition source may include a second spark ignitor coupled to the outlet plate.

In some embodiments, the second ignition source is offset circumferentially from the first ignition source by about 180 degrees.

In some embodiments, the ignition source may be configured to project a first flame into one of the inner combustion cells and a second flame into one of the outer combustion cells during operation of the dynamic pressure exchanger. In some embodiments, the first angular position may be offset from the second angular position by about 180 degrees relative to the central axis.

According to another aspect of the present disclosure, a dynamic pressure exchanger may include an inlet plate and a rotor assembly. The inlet plate may be formed to include an inner inlet port that extends circumferentially along a first arc about a central axis of the dynamic pressure exchanger and an outer inlet port that extends along a second arc about the central axis. The outer inlet port may be circumferentially offset from the inner inlet port. The outer inlet port may be spaced radially further from the central axis than the inner inlet port.

The rotor assembly may be mounted for rotation relative to the inlet plate about the central axis. The rotor assembly may include an inner rotor and an outer rotor. The inner rotor may be formed to include a plurality of axially-extending inner combustion cells arranged circumferentially around the central axis to align with the inner inlet port when the rotor assembly rotates about the central axis. The outer rotor may be formed to include a plurality of axially-extending outer combustion cells arranged circumferentially around the central axis to align with the outer inlet port when the rotor assembly rotates about the central axis.

In some embodiments, the dynamic pressure exchanger may include an ignition system. The ignition system may be configured to ignite a first fuel mixture in one of the plurality of inner combustion cells when the one of the plurality of inner combustion cells is aligned with a first angular position relative to the central axis and to ignite a second fuel mixture in one of the plurality of outer combustion cells when the one of the plurality of outer combustion cells is aligned with a second angular position circumferentially offset from the first angular position.

In some embodiments, the dynamic pressure exchanger may include an outlet plate. The outlet plate may be formed to include an inner outlet port that extends circumferentially along a third arc about the central axis and an outer outlet port that extends circumferentially along a fourth arc of the central axis. The outer outlet port may be circumferentially offset from the inner outlet port and may be spaced radially further from the central axis than the inner outlet port.

In some embodiments, the second angular position may be spaced apart circumferentially from the second angular position by about 180 degrees relative to the central axis. In some embodiments, the ignition system may include a first ignition source including a first spark ignitor coupled to the outlet plate. In some embodiments, the ignition system may include a second ignition source including a second spark ignitor coupled to the outlet plate.

In some embodiments, the rotor assembly may include an inner tube, an intermediate tube, an outer tube, a plurality of axially-extending inner webs, and a plurality of axially-extending outer webs. The intermediate tube may be arranged circumferentially around the inner tube. The outer tube may be arranged circumferentially around the intermediate tube. The plurality of axially-extending inner webs may extend radially between the inner and intermediate tubes to define the inner combustion cells. The plurality of axially-extending outer webs may extend radially between the intermediate and outer tubes to define the outer combustion cells.

According to another aspect of the present disclosure, a method of operating a dynamic pressure exchanger is disclosed. The method may include rotating a rotor assembly about a central axis of the dynamic pressure exchanger relative to an inlet plate formed to include an inner inlet port and an outer inlet port circumferentially offset from the inner inlet port and spaced radially further from the central axis than the inner inlet port, the rotor assembly including an inner rotor formed to include a plurality of inner combustion cells and an outer rotor arranged circumferentially around the inner rotor and formed to include a plurality of outer combustion cells, conducting a first fuel mixture into the inner combustion cells through the inner inlet port, and conducting a second fuel mixture into the outer combustion cells through the outer inlet port.

In some embodiments, the method may further include igniting the first fuel mixture in one of the inner combustion cells at a first angular position relative to the central axis and igniting the second fuel mixture in one of the outer combustion cells at a second angular position circumferentially offset from the first angular position relative to the central axis. In some embodiments, the second angular position is circumferentially offset from the first angular position by about 180 degrees.

In some embodiments, the rotor assembly may include an inner tube, an intermediate tube, an outer tube, a plurality of axially-extending inner webs, and a plurality of axially-extending outer webs. The intermediate tube may be arranged circumferentially around the inner tube. The outer tube may be arranged circumferentially around the intermediate tube. The plurality of axially-extending inner webs may be located between the inner and intermediate tubes to define the inner combustion cells. The plurality of axially-extending outer webs may be located radially between the intermediate and outer tubes to define the outer combustion cells.

These and other features of the present disclosure will become more apparent from the following description of the illustrative embodiments.

DETAILED DESCRIPTION OF THE DRAWINGS

Figure 1:
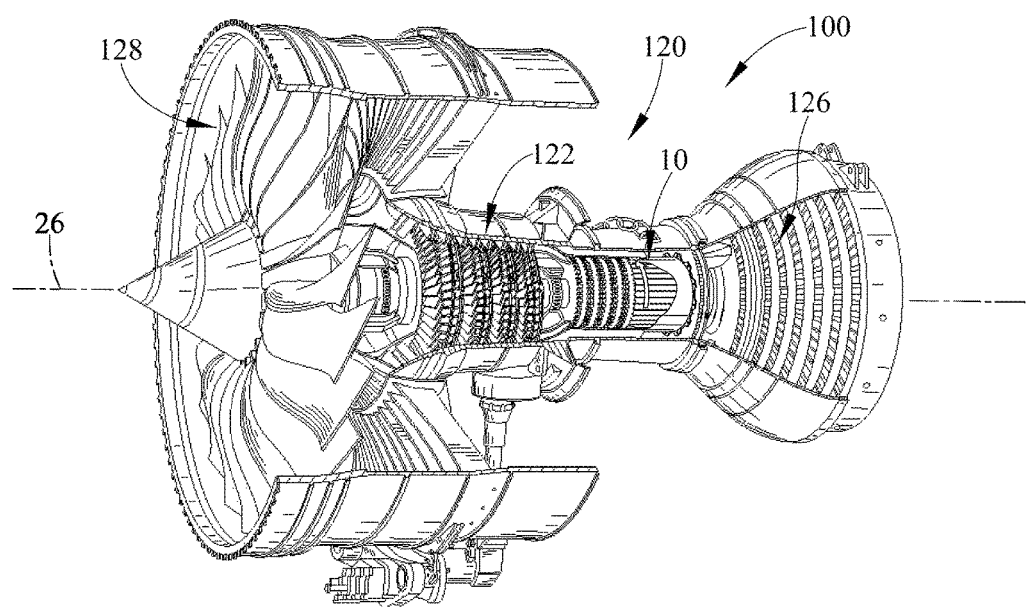
FIG. 1 is a cutaway view of a gas turbine engine including a dynamic pressure exchanger in accordance with the present disclosure, the dynamic pressure exchanger being configured for constant volume combustion and arranged to continuously receive and ignite a mixture of fuel and air to produce hot high-pressure products that are directed into a turbine to drive the engine.

For the purposes of promoting an understanding of the principles of the disclosure, reference will now be made to a number of illustrative embodiments illustrated in the drawings and specific language will be used to describe the same.

An illustrative gas turbine engine 100 includes a dynamic pressure exchanger 10 as part of an engine core 120 that powers a fan assembly 128 as shown in FIG. 1. The engine core 120 includes a compressor 122 and a turbine 126. The compressor 122 compresses air drawn into the engine 100 and delivers high-pressure air to the dynamic pressure exchanger 10. The dynamic pressure exchanger 10 is configured to receive and ignite a mixture 224 of the compressed air and fuel in a constant volume combustion process 200. Products of the combustion process 200 in the dynamic pressure exchanger 10 are directed into the turbine 126 where work is extracted to drive the compressor 122, the fan assembly 128 and, sometimes, an output shaft.

Figure 2:
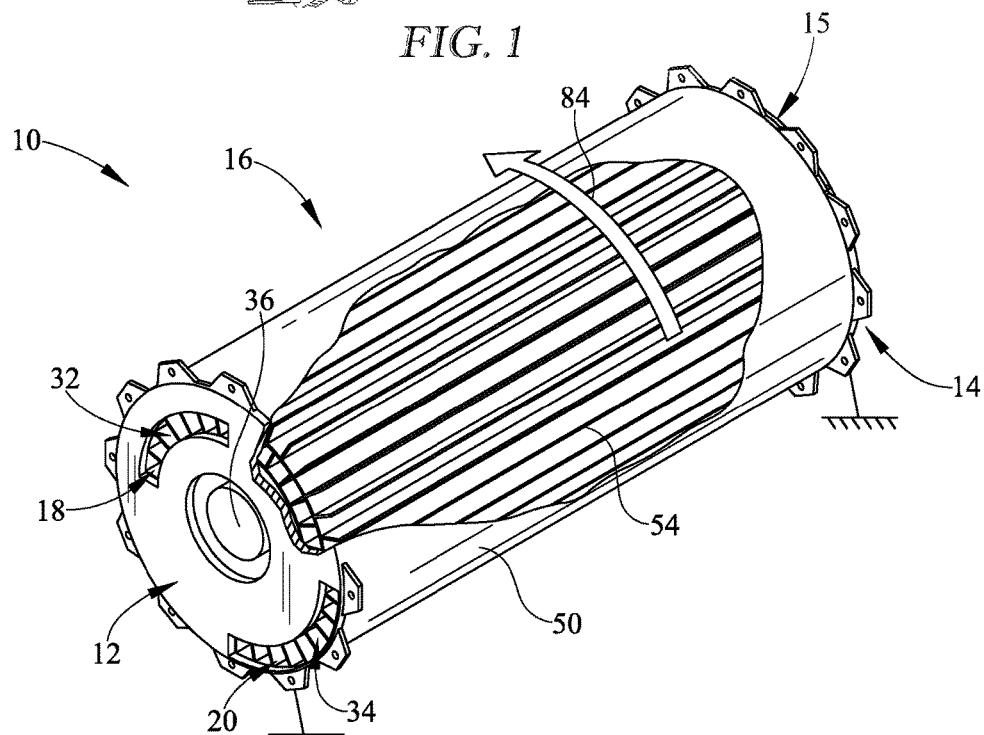
FIG. 2 is a cutaway view of the dynamic pressure exchanger included in the gas turbine engine of FIG. 1 showing that the dynamic pressure exchanger includes, from left to right, an inlet plate, a rotor drum assembly having an inner rotor and an outer rotor arranged around the inner rotor to promote heat exchange between the inner and outer rotors, and an outlet plate.
Figure 3:
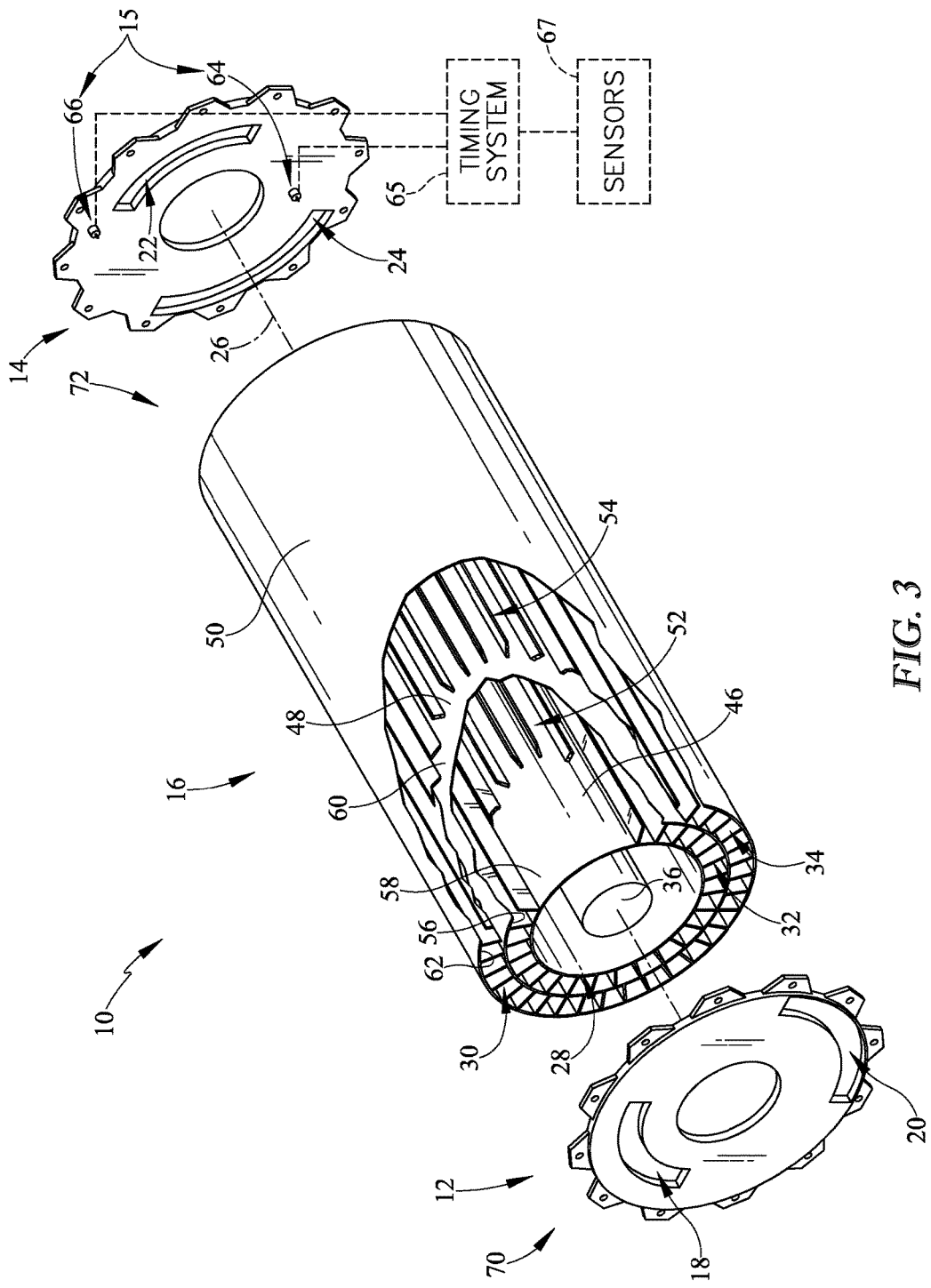
FIG. 3 is an exploded view of the dynamic pressure exchanger of FIG. 2 showing that the dynamic pressure exchanger includes the inlet plate arranged to conduct fueled air into the rotor assembly, the rotor drum assembly arranged to receive, combust, and exhaust the fueled air, and the outlet plate arranged to direct the gasses of the combustion process out of the rotor assembly into the turbine.

The dynamic pressure exchanger 10 includes a rotor assembly 16 (sometimes called a double rotor assembly) configured to rotate about a central axis 26 of the dynamic pressure exchanger 10 as suggested in FIGS. 2 and 3. The rotor assembly 16 includes an inner rotor 28 and an outer rotor 30 arranged around the inner rotor 28. The rotor assembly 16 is configured to transfer heat from hot combustion zones 40, 44 of the inner and outer rotors 28, 30 to cool inlet zones 38, 42 of the inner and outer rotors 28, 30 as suggested in FIG. 4. As such, the rotor assembly 16 has, generally, a more uniform temperature distribution and the highest temperatures of the hot combustion zones 40, 44 are lowered. In other embodiments, the rotor assembly 16 includes more than two rotors 28, 30.

In the illustrative embodiment, the dynamic pressure exchanger 10 is configured to use transient internal fluid flow to compress fuel and air prior to combustion to improve the efficiency of combustion within the dynamic pressure exchanger 10. The dynamic pressure exchanger 10 illustratively includes an inlet plate 12 (sometimes called an end plate), an outlet plate 14 spaced apart from the inlet plate 12 along the central axis 26, the rotor assembly 16 positioned between the inlet and outlet plates 12, 14, and an ignition system 15 as shown in FIGS. 2 and 3. The inlet plate 12 is arranged to direct the fueled air 224 into the rotor assembly 16 as suggested in FIG. 2. The rotor assembly 16 is arranged to receive and combust the fueled air 224 to produce hot high-pressure products as part of the combustion process 200 as the rotor assembly 16 rotates about the central axis 26 relative to the inlet plate 12 and the outlet plate 14. The ignition system 15 is configured to ignite the fueled air 224 in the rotor assembly 16 to cause the fueled air 224 to combust. The outlet plate 14 is arranged to direct the hot high-pressure products out of the rotor assembly 16 into the turbine 126 included in the engine 100 as suggested in FIG. 1.

The compressor 122 is located upstream of the dynamic pressure exchanger 10 as shown in FIG. 1. In the illustrative embodiment, the compressor 122 provides a flow of unfueled air 226 and fuel nozzles continuously spray fuel into a portion of the flow of unfueled air 226 upstream of the inner inlet port 18 to form the fueled air 224. The inlet plate 12 is positioned adjacent an inlet end 70 of the rotor assembly 16 to conduct the flow of compressed fueled air 224 into the rotor assembly 16 as suggested in FIG. 2.

Figure 4:
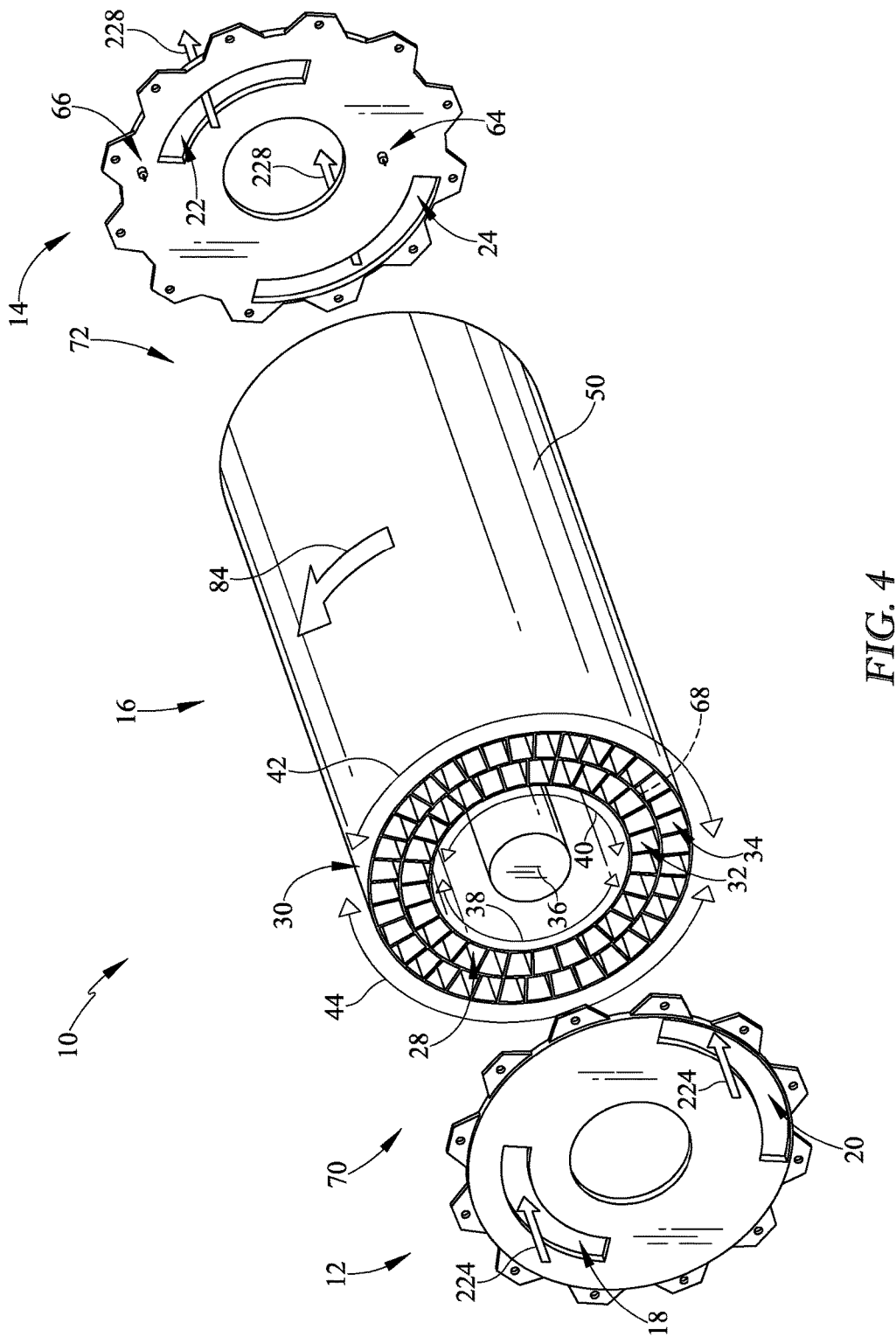
FIG. 4 is an exploded view of the dynamic pressure exchanger of FIG. 2 suggesting that a second combustion cycle is out of phase with a first combustion cycle to cause hot combustion zones of the inner and outer rotors to transfer heat to cool inlet zones of the inner and outer rotors.

The illustrative inlet plate 12 is formed to include an inner inlet port 18 and an outer inlet port 20 as shown in FIGS. 2-4. As the rotor assembly 16 rotates about the central axis 26, each inlet port 18, 20 directs a portion of the flow of fueled air 224 into combustion cells 32, 34 of the rotor assembly 16 as each combustion cell 32, 34 temporarily aligns with the corresponding inlet port 18, 20.

Illustratively, the inner inlet port 18 extends axially through the inlet plate 12 along a first arc around the central axis 26 as shown in FIGS. 3 and 4. The outer inlet port 20 extends axially through the inlet plate 12 along a second arc around the central axis 26. The outer inlet port 20 is circumferentially offset from the inner inlet port 18 and spaced radially further from the central axis 26 than the inner inlet port 18 as shown in FIG. 3.

Illustratively, the outer inlet port 20 is circumferentially offset from the inner inlet port 18 by about 180 degrees as shown in FIG. 4. In other embodiments, the circumferentially offset between the outer inlet port 20 and the inner inlet port 18 is in a range of about zero to about 180 degrees. In other embodiments, the circumferentially offset between the outer inlet port 20 and the inner inlet port 18 is in a range of about 180 degrees to about 360 degrees.

The rotor assembly 16 is mounted for rotation about the central axis 26 relative to the inlet plate 12 and the outlet plate 14 as suggested by arrow 84 in FIG. 2. In other embodiments, the rotor assembly 16 rotates in an opposite direction. The rotor assembly 16 is configured to transfer heat from the hot combustion zones 40, 44 of the rotor assembly 16 to the cool inlet zones 38, 42 of the rotor assembly 16 as suggested in FIGS. 4 and 5. As such, the rotor assembly 16 has, generally, a more uniform temperature distribution and the highest temperatures of the hot combustion zones 40, 44 are lowered.

The illustrative rotor assembly 16 includes the inner rotor 28 and the outer rotor 30 arranged circumferentially around the inner rotor 28 as shown in FIGS. 3 and 4. Illustratively, the outer rotor 30 is configured to rotate at the same rotational speed as the inner rotor 28. In the illustrative embodiment, the outer rotor 30 is coupled to the inner rotor 28 for rotation therewith.

The inner and outer rotors 28, 30 are each configured to conduct their own combustion process 200. The inner rotor 28 has a first combustion cycle 80 and the outer rotor 30 has second combustion cycle 82 as suggested in FIGS. 4 and 5. The combustion process 200 occurring in the inner rotor 28 begins and ends at different angular positions than the combustion process 200 occurring in the outer rotor 30. As a result, the second combustion cycle 82 is out of phase with the first combustion cycle 80 to promote heat exchange between the rotors 28, 30 as suggested in FIGS. 4 and 5.

During the combustion process 200 in the inner rotor 28, fueled air 224 is received by inner combustion cells 32 of the inner rotor 28 through the inner inlet port 18 as suggested in FIG. 4. The fueled air 224 is ignited by a first spark ignitor 64 included in the ignition system 15 to cause the fueled air 224 to combust and produce hot high-pressure combustion products as the inner rotor 28 rotates about the central axis 26.

Figure 5:
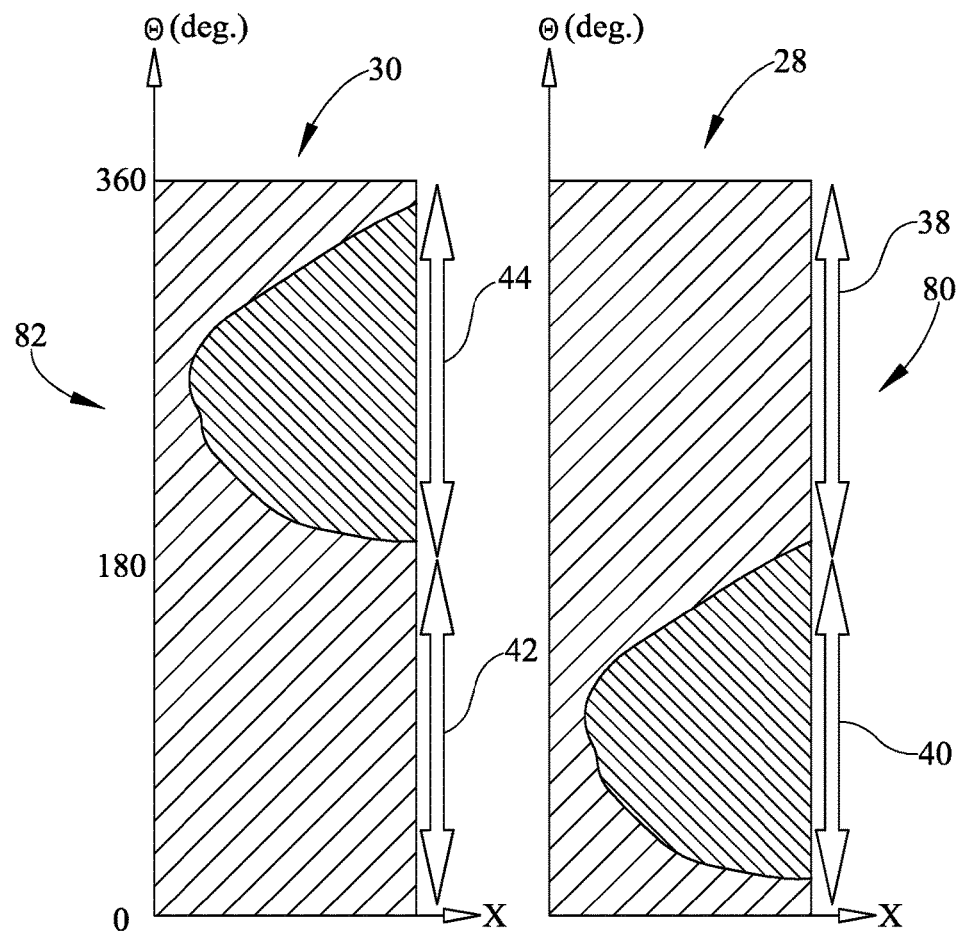
FIG. 5 is a diagrammatic view showing, from left to right, a temperature distribution of the outer rotor and a temperature distribution of the inner rotor suggesting that the hot combustion zones of the inner and outer rotors align with the cool inlet zones of the inner and outer rotors.

The inner inlet port 18 is stationary relative to the inner rotor 28 to causes the fueled air 224 to continuously cool one side of the inner rotor 28 to form the cool inlet zone 38 of the inner rotor 28 as suggested in FIGS. 4 and 5. The fueled air 224 is combusted on another side of the inner rotor 28 opposite the cooled side to cause the hot high-pressure products to heat said another side of the inner rotor 28 to form the hot combustion zone 40 as suggested in FIGS. 4 and 5. The hot high-pressure products are directed out of the inner rotor 28 through an inner outlet port 22 of the outlet plate 14.

During the combustion process 200 in the outer rotor 30, the fueled air 224 is directed into outer combustion cells 34 of the outer rotor 30 and ignited by a second spark ignitor 66 included in the ignition system 15 to cause the fueled air 224 to combust and produce hot high-pressure combustion products as the outer rotor 30 rotates about the central axis 26 as suggested in FIG. 4. The outer inlet port 20 is stationary relative to the outer rotor 30 to cause the fueled air 224 to continuously cool one side of the outer rotor 30 to form the cool inlet zone 42 of the outer rotor 30 and the hot high-pressure products heat another side of the outer rotor 30 to form the hot combustion zone 44 of the outer rotor 30 as suggested in FIG. 4. The hot high-pressure products are directed out of the outer rotor 30 through an outer outlet port 24 of the outlet plate 14.

The cool inlet zone 42 of the outer rotor 30 is arranged around the hot combustion zone 40 of the inner rotor 28 as shown in FIG. 4. The hot combustion zone 44 of the outer rotor 30 is arranged around the cool inlet zone 38 of the inner rotor 28. Heat generated in the hot combustion zones 40, 44 of the inner and outer rotors 28, 30 is transferred to the cool inlet zones 38, 42 of the inner and outer rotors 28, 30 during operation of the dynamic pressure exchanger 10.

The inner rotor 28 is formed to include the plurality of inner combustion cells 32 arranged to align circumferentially with the inner inlet port 18 and the outer rotor 30 is formed to include the plurality of outer combustion cells 34 arranged to align circumferentially with the outer inlet port 20 as shown in FIGS. 4 and 5. In the illustrative embodiment, the inner and outer combustion cells 32, 34 extend axially between the inlet end 70 and an outlet end 72 of the rotor assembly 16. The outer combustion cells 34 of the outer rotor 30 are arranged circumferentially around the inner combustion cells 32 of the inner rotor 28 as shown in FIG. 4.

In other embodiments, the rotor assembly 16 includes a plurality of rotors 28, 30, etc. such as, for example, more than three rotors 28, 30, etc. The number of rotors 28, 30, etc. included in the rotor assembly 16 may be determined by desired thermal and aerodynamic loading (mass flow rate) performance. In such embodiments, two or more of the rotors 28, 30, etc. may be offset from adjacent rotors 28, 30, etc. to cause the combustion processes in the rotors 28, 30, etc. to be out of phase.

The illustrative rotor assembly 16 includes an inner tube 46, an intermediate tube 48, an outer tube 50, a plurality of inner webs 52, and a plurality of outer webs 54 as shown in FIG. 3. The inner tube 46, the intermediate tube 48, and the plurality of inner webs 52 cooperate to form the plurality of inner combustion cells 32. The intermediate tube 48 is arranged circumferentially around the inner tube 46 as shown in FIGS. 3 and 4. The axially-extending inner webs 52 are located radially between the inner and intermediate tubes 46, 48 to define the inner combustion cells 32.

The intermediate tube 48, the outer tube 50, and the plurality of outer webs 54 cooperate to form the plurality of outer combustion cells 34 as shown in FIGS. 3 and 4. The outer tube 50 is arranged circumferentially around the intermediate tube 48. The axially-extending outer webs 54 are located radially between the intermediate and outer tubes 48, 50 to define the outer combustion cells 34.

In the illustrative embodiment, the intermediate tube 48 is arranged to form a portion of the inner and the outer combustion cells 32, 34. The intermediate tube 48 includes an inwardly-facing surface 56 that faces an outwardly-facing surface 58 of the inner rotor 28 to locate the inner combustion cells 32 therebetween. The intermediate tube 48 includes an outwardly-facing surface 60 that faces an inwardly-facing surface 62 of the outer rotor 30 to locate the outer combustion cells 34 therebetween.

In other embodiments, the rotor assembly 16 includes a second intermediate tube that cooperates with the outer tube 50 to define the outer combustion cells 34. In some embodiments, a space is formed between the intermediate tube 48 and the second intermediate tube. In some embodiments, a material 68 with high-thermal conductivity is positioned in the space between the intermediate tubes to promote heat transfer between the inner and outer rotors 28, 30.

In the illustrative embodiment, the combustion cells 32, 34 extend axially and generally parallel with the central axis 26. In other embodiments, the combustion cells 32, 34 extend axially along and circumferentially about the central axis 26. In the illustrative embodiment, the rotor assembly 16 is rotated by a shaft 36. In some embodiments, the combustion cells 32, 34 are arranged to cause the rotor assembly 16 to rotate as a result of the shape of the combustion cells 32, 34 and the combustion processes that occurs within the combustion cells 32, 34.

The ignition system 15 includes the first ignition source 64 and the second ignition source 66 as shown in FIG. 3. The first ignition source 64 is configured to ignite fueled air 224 in an inner combustion cell 32 aligned at a first angular position relative to the central axis 26. The second ignition source 66 is configured to ignite fueled air 224 in an outer combustion cell 34 aligned at a second angular position relative to the central axis 26. The second angular position is offset circumferentially from the first angular position to cause the second combustion cycle 82 to be out of phase with the first combustion cycle 80.

Illustratively, the first ignition source 64 includes a first spark ignitor 64 and the second ignition source 66 includes a second spark ignitor 66 as shown in FIG. 4. The first and second spark ignitors 64, 66 are coupled to the outlet plate 14. In other embodiments, the ignition sources 64, 66 may be coupled to the inlet plate 12, the rotor assembly 16, or any other suitable component of the gas turbine engine 100. The second ignition source 66 is circumferentially offset from the first ignition source 64 and spaced radially further from the central axis 26 than the first ignition source 64.

In the illustrative embodiment, the first ignition source 64 is circumferentially offset from the second ignition source 66 by about 180 degrees. In other embodiments, the circumferentially offset between the first and second ignition sources 64, 66 is in a range of about zero to about 180 degrees. In other embodiments, the circumferentially offset between the first and second ignition sources 64, 66 is in a range of about 180 to about 360 degrees. In other embodiments, the circumferentially offset between the first and second ignition sources 64, 66 is about 90 degrees. In other embodiments, the circumferentially offset between the first and second ignition sources 64, 66 is about 45 degrees.

In some embodiments, the ignition system 15 includes a timing system 65 (sometimes called a control system) configured to excite the ignition sources 64, 66 at predetermined intervals as suggested in FIG. 3. In some embodiments, the timing system is configured to determine the intervals to excite the ignition sources 64, 66 based on performance feedback of the dynamic pressure exchanger 10 received from sensors 67 (i.e. temperature sensors, speed sensors, flow sensors, etc.). In other embodiments, the ignition sources 64, 66 include flame sources arranged to emit a flame into the combustion cells 32, 34.

The outlet plate 14 is configured to direct the hot-high pressure combustion products out of the rotor assembly 16 toward the turbine 126 as suggested in FIGS. 1 and 2. The outlet plate 14 is positioned adjacent the rotor assembly 16 to close the outlet end 72 of the rotor assembly 16 to control the flow of combustion products directed out of the rotor assembly 16.

The illustrative outlet plate 14 is formed to include the inner outlet port 22 and the outer outlet port 24 as shown in FIGS. 3 and 4. The hot-high pressure combustion products are expelled out of the outlet end 72 of the combustion cells 32, 34 through the outlet ports 22, 24 as each combustion cell 32, 34 aligns with the corresponding outlet port 22, 24.

Illustratively, the inner outlet port 22 extends axially through the outlet plate 14 along a third arc around the central axis 26 as shown in FIGS. 3 and 4. The outer outlet port 24 extends axially through the outlet plate 14 along a fourth arc around the central axis 26 as shown in FIGS. 3 and 4. The outer outlet port 24 is circumferentially offset from the inner outlet port 22 and spaced radially further from the central axis 26 than the inner outlet port 22. Illustratively, the outer outlet port 24 is circumferentially offset from the inner outlet port 22 by about 180 degrees as shown in FIG. 4.

Figure 6:
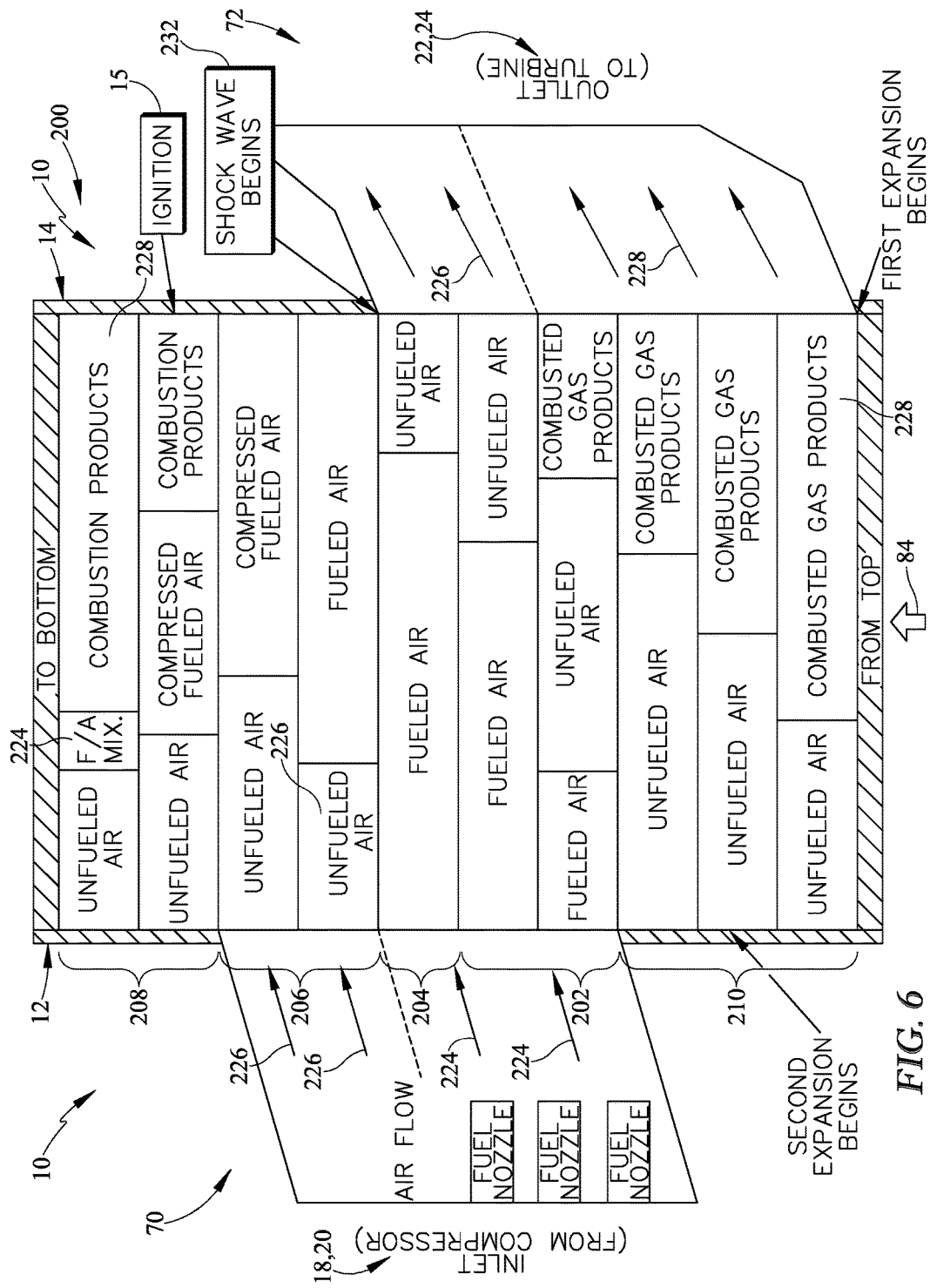
FIG. 6 is a diagrammatic view of a combustion process that occurs within each combustion cell of the dynamic pressure exchanger and depicts the cycle of a single combustion cell at discrete circumferential positions as it completes a revolution about the central axis.
Figure 7:
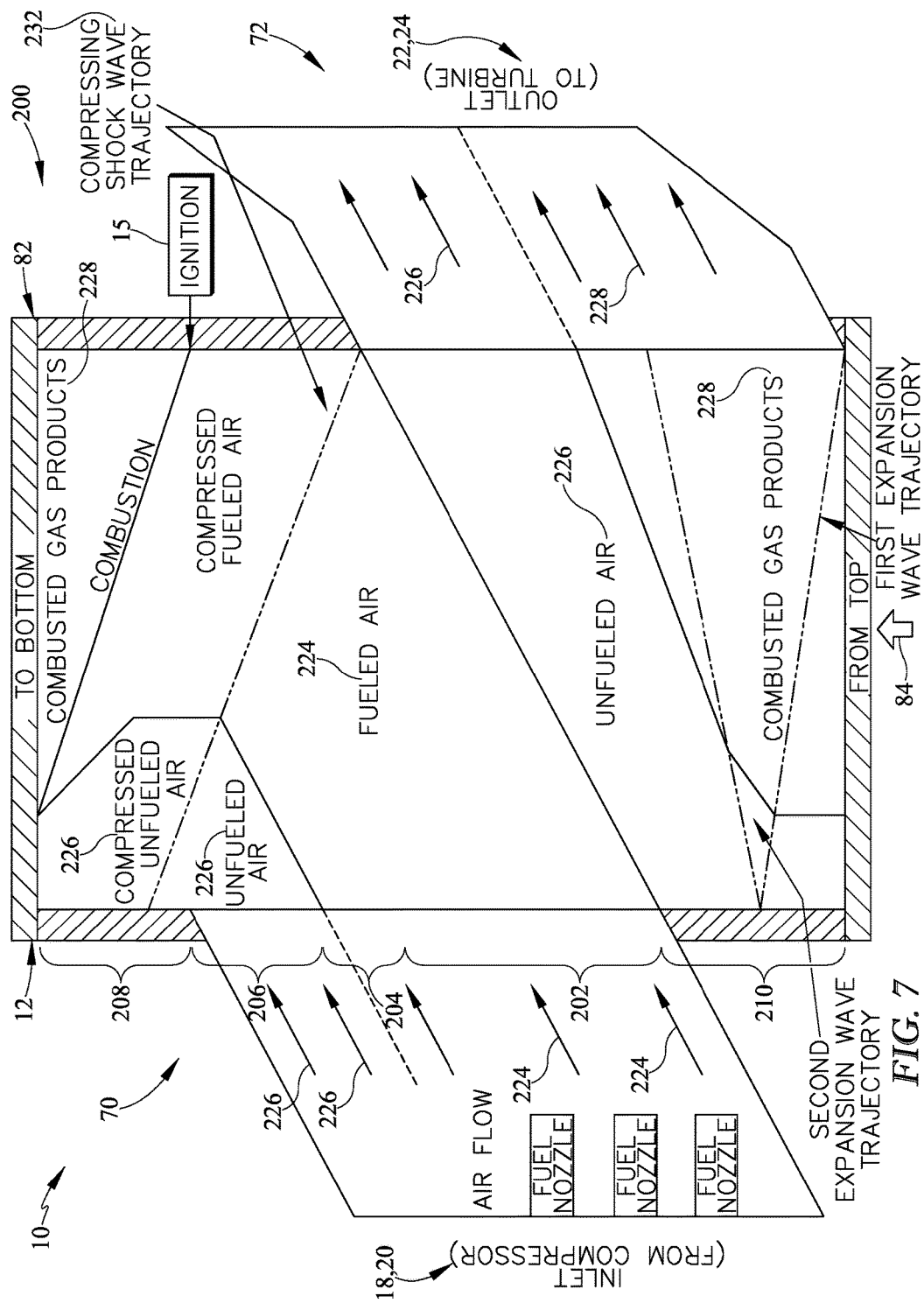
FIG. 7 is another diagrammatic view of the combustion process that occurs within each combustion cell of the dynamic pressure exchanger and depicts the cycle of a single combustion cell at continuous circumferential positions as it completes a revolution about the central axis.

The constant volume combustion process 200 is depicted in space-time wave diagrams shown in FIGS. 6 and 7. The illustrative combustion process 200 occurs within each of the inner and outer combustion cells 32, 34 as the rotor assembly 16 rotates about the central axis 26 as suggested in FIGS. 6 and 7. The wave diagram shown in FIG. 6 depicts the sequence of events occurring during one combustion cycle within the combustion cells 32, 34 at discrete circumferential positions. The wave diagram shown in FIG. 5 depicts the sequence of events occurring during one combustion cycle within the combustion cells 32, 34 in continuous circumferential positions. The arrow 84 indicates the direction of rotation of the combustion cells 32, 34. For convenience, only the first combustion cycle 80 is described in detail. The second combustion cycle 82 is substantially similar to the first combustion cycle 80.

The combustion process 200 is periodic such that the top of each wave diagram shown in FIGS. 6 and 7 loops around and joins with its own bottom. The wave diagrams, for the purpose of description, may be started at any point. However, for convenience, the description is started at step 202 toward the bottom of the wave diagrams shown in FIGS. 6 and 7.

In step 202, the combustion cell 32 aligns with and opens into the inner inlet port 18 as shown in FIGS. 6 and 7. Fueled air 224 is directed through the inner inlet port 18 into the combustion cell 32. The fueled air 224 has relatively greater pressure than the remaining unfueled air 226 and combusted gas products 228 located in the combustion cell 32. As such, the fueled air 224 is drawn into the combustion cell 32 and the unfueled air 226 and combusted gas products 228 flow axially through the inner outlet port 22. Unfueled air 226 from a prior cycle provides a buffer between the fueled air 224 and combusted gas products 228 from the prior cycle. As such, the fueled air 224 is blocked from being ignited unintentionally by the combusted gas products 228.

In a step 204, the unfueled air 226 is significantly expelled out of the outlet end 72 of the combustion cell 32 and the combustion cell 32 rotates beyond the inner outlet port 22 as shown in FIGS. 6 and 7. As a result, the outlet plate 14 blocks the fueled air 224 from escaping through the outlet end 72 of the combustion cell 32. A shock wave 232 initiates at the outlet end 72 of the combustion cell 32 and propagates toward the inlet end 70 to compress the fueled air 224 in response to the outlet plate 14 closing the outlet end 72 of the combustion cell 32 as suggested in FIG. 7.

In a step 206, the combustion cell 32 has rotated beyond the flow of fueled air 224 as shown in FIGS. 6 and 7. The flow of unfueled air 226 continues to enter the combustion cell 32 to provide the buffer of unfueled air 226.

In a step 208, the combustion cell 32 rotates beyond the inner inlet port 18 to block the flow of unfueled air 226 from entering the combustion cell 32 as shown in FIGS. 6 and 7. The ignition system 15 ignites the compressed fueled air 224 in the combustion cell 32. In other embodiments, the compressed fueled air 224 ignites as a result of auto-ignition. The fueled air 224 expands to form the combusted gas products 228 and the unfueled air 226 experiences no combustion.

In a step 210, the inlet end 70 of the combustion cell 32 is blocked by the inlet plate 12 as shown in FIGS. 6 and 7. The outlet end 72 of the combustion cell 32 aligns with and opens into the inner outlet port 22 formed in the outlet plate 14. The combusted gas products 228 expand and exit the combustion cell 32 through the relatively low-pressure outlet port 22 while the combustion cell 32 opens into the inner outlet port 22. The gas products 228 are directed into the turbine 126 to power the engine 100. The combustion cell 32 continues to rotate about the central axis 26 and returns to step 202 as shown in FIGS. 6 and 7.

In the illustrative embodiment, the disclosed features are included in a dynamic pressure exchanger 10 arranged for constant volume combustion. In other embodiments, the disclosed features may be included in pressure exchangers, flow dividers, flow combiners, wave rotors, etc.

In some embodiments, a constant volume combustor (CVC) integrated into a dynamic pressure exchanger (DPE) is equipped with two rotors (i.e., inner and outer rotors) as shown in FIG. 1. Both ends of the rotors have stationary seal plates with intake and exhaust ports in different locations based on designed cycle pattern or the operation. The rotor configuration, in one embodiment, has two ignition points. One ignition point is at 0 degrees and the other ignition point is at 180 degrees for the inner and outer rotors, respectively making combustion and blowdown phases reside at 0<theta<180 degrees of the inner rotor and 180<theta<360 degrees of the outer rotor. Ignition spark plugs may be installed from either stationary seal plates or side walls of the rotors depending on available time to complete the combustion process.

The disclosure may offer remedies for two issues in integration of unsteady combustors into production engines; thermal load management and net thrust production. Alignment of the inner and outer rotors with the corresponding seal plates is determined such that a filling phase of the in the inner and outer combustion cells overlap combustion/blowdown phases of the combustion cells in the counterpart rotor in order to ameliorate thermal load by heat transfer between them. Illustratively, the inner rotor wall is contacted with the outer rotor wall and the inner and outer rotor walls are made of high thermal conductivity materials. The double rotor configuration may allow the system to process more mass flow rate leading to improvement of net thrust production.

Constant volume combustion processes are thermodynamically more efficient combustion processes leading to desirable specific fuel consumption than constant pressure combustion processes. However, the unsteady nature of the constant volume combustion process may reduce the amount of processed fuel mass flow rate when compared with a constant pressure combustion process. This may lead to potentially less net thrust production per cross-sectional area of the combustion device.

The geometrical layout of dynamic pressure exchanger in a gas turbine system may be an issue in terms of thermal load management applied to the rotor due to limited available space in the gas turbine system. Some dynamic pressure exchangers are arranged for a co-flow process. The inlet ports are located at the upstream side of the dynamic pressure exchanger while the outlet ports are located on the downstream side. A co-flow process design is suitable for propulsion applications due to space and weight limitations in an aircraft. Nonetheless, typical dynamic pressure exchanger may have a strong asymmetric temperature distribution leading to thermal limitations during the operation of the dynamic pressure exchanger.

One remedy to ameliorate thermal load issues is to use a counter-flow process design. In such a design, sets of inlet and outlets ports are located at both upstream and downstream sides of the rotor leading to more uniform temperature distribution across the rotor. The counter-flow process design may include a complicated plumbing system and may be less suitable for propulsion applications due to limited available space and may have potentially more severe penalties for pressure loss than ground-based power generation applications. The illustrative dynamic pressure exchanger may have the advantages of increase net thrust production per cross-sectional area and a lower thermal load on the rotor assembly. The increased net thrust production per cross-sectional area may increases the amount of mass flow rate to be processed leading to higher net thrust production. The inner rotor is illustratively operated at about a 180 degrees phase shift compared with the outer rotor making heated combustion cells during the combustion process reside next to cooled combustion cells during the filling and blowdown processes enhancing local heat transfer as suggested in FIG. 4.

Some dynamic pressure exchangers include a single rotor configuration. Ignition spark plugs included in the single rotor may be installed at 180 degrees. Premixed reactants, such as cold gas, continuously flow through the inlet port filling each cell of the rotor by its rotational motion. After the premixed reactants flow into the combustion cells of the rotor, both ends of the cells are closed by the seal plates due to cells position relative to the seal plates. When the cell is circumferentially moved to the ignition point (at 180 degrees in this example), ignition is initiated by the spark plug and the combustion is completed before the combustion cell starts to open by the exhaust port. Opening the exhaust port allows the blowdown process of high pressure products in the combustion cell. Further rotation of the rotor allows the combustion cell to open into the inlet for a filling process for the next cycle.

In single rotor dynamic pressure exchangers, high temperature gas resides in the exhaust side of the rotor leading to asymmetric temperature distributions which may reduce operational limit/life cycle of the rotor. The cross-sectional area of the inlet port may be reduced leading to potential reduction of net thrust production. A maximum amount of air mass flow rate may be bounded by the choked flow condition. Reduced cross-sectional area may increase local flow speed which leads to higher friction and pressure loss and may be a penalty in propulsion applications.

An illustrative embodiment of the suggested double rotor configuration is shown in FIG. 2. Ignition spark plugs are installed at 0 and 180 degrees for the inner and outer rotors, respectively. Premixed reactants, such as cold gas, continuously flow through the two inlet ports filling each combustion cell. Each inlet port allows each rotor to be filled with the cold gas in different locations of the combustion cells (i.e., 0<theta<180 degrees of the inner rotor and 180<theta<360 degrees of the outer rotor). After premixed reactants flow into the cells of the rotors, both ends of the cells are closed by the seal plates due to their positions relative to the seal plates. When the cell is circumferentially moved to the ignition point (at 0 deg. for the inner rotor, at 180 degrees for the outer rotor in this example), ignition is initiated by the spark plug and the combustion is completed before the cell starts to open by the exhaust ports. Opening the exhaust ports allows initiating blowdown process of high pressure products in the cells. Further rotation of the rotors allows opening the inlet sides of the cells initiating filling process for the next cycle.

In the illustrative dynamic pressure exchanger, high temperature gas may reside on the exhaust sides of both the inner and outer rotors. A time-averaged temperature distribution of both rotors may be more symmetric due to heat transfer between the rotors. The total cross-sectional area of the inlet ports may be relative to a single rotor assembly due to the number of available rotors which may lead to increased net thrust production. A number of cycle patterns and derivatives are possible based on the cycle pattern of the single rotor (e.g. two cycles per rotor with two ports on both inlet and outlet seal plates) and the number of available rotors (e.g. triple rotors).

In general, the time-averaged net thrust is proportional to the time-averaged fuel mass flow rate as $\bar{F}_N = \bar{m}_f g I_s$, where $\bar{m}_f$, g, and $I_s$, represent a time-averaged fuel mass flow rate, a gravitational acceleration, and a fuel based specific impulse, respectively. A typical constant volume combustion dynamic pressure exchanger may reduce the inlet cross-sectional area due to the nature of cyclic operation in each combustion cell leading to potential reduction of net thrust production defined the equation above. The trend appears in propulsion systems based on unsteady combustion processes, although thermodynamically efficient cycles are supposed to provide better fueled based specific impulse or specific fuel consumption.

A constant pressure combustion based propulsion system may have wider inlet cross-sectional areas due to the steady nature of the combustion process. In order to produce the same amount of net thrust with a constant volume combustion based propulsion system, the fuel-based specific impulse of the constant volume combustion based propulsion system may be increased as the counterpart based on the equation above. In a tradeoff of propulsion system diameter against drag/weight/vehicle performance, unsteady propulsion systems may use larger inlet diameters than steady propulsion systems in order to generate the desired net thrust production. This disclosure may offer a remedy to improve net thrust production with the constant volume combustion based propulsion systems.

The geometrical layout of the constant volume combustion dynamic pressure exchanger into a gas turbine system is important in terms of thermal management. There are at least two approaches in terms of the arrangement; the co-flow and counter-flow arrangements. The co-flow arrangement offers a simple and compact configuration for propulsion applications, but the rotor may provide asymmetric thermal loads which lead to a lower operational limit. The counter-flow arrangement has a set of the inlet and outlet ports placed upstream and downstream of the rotor, respectively making two cycles per revolution of the rotor. The counter-flow arrangement allows the rotor to be self-cooled because the rotor is filled with hot and cold gases from both sides making thermal load on the rotor more uniform compared with the co-flow arrangement. The counter-flow arrangement may have complex manifolds and cooling systems. The disclosed features may provide a remedy to improve thermal management with constant volume combustion based propulsion system.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A dynamic pressure exchanger comprising
an inlet plate formed to include an inner inlet port that extends circumferentially along a first arc about a central axis of the dynamic pressure exchanger and an outer inlet port that extends along a second arc about the central axis, the outer inlet port circumferentially offset from the inner inlet port and spaced radially further from the central axis than the inner inlet port,
a double rotor assembly mounted for rotation relative to the inlet plate about the central axis, the double rotor assembly including (i) an inner rotor formed to include a plurality of axially-extending inner combustion cells arranged adjacent to one another circumferentially around the central axis to align with the inner inlet port at predetermined intervals when the double rotor assembly rotates about the central axis and (ii) an outer rotor arranged circumferentially around the inner rotor and formed to include a plurality of axially-extending outer combustion cells arranged adjacent to one another circumferentially around the central axis to align with the outer inlet port at predetermined intervals when the double rotor assembly rotates about the central axis,
a first ignition source configured to ignite a first fuel mixture in an inner combustion cell aligned at a first angular position relative to the central axis, and
a second ignition source configured to ignite a second fuel mixture in an outer combustion cell aligned at a second angular position relative to the central axis,
wherein the second angular position of the second ignition source is located offset circumferentially from the first angular position of the first ignition source to cause a combustion process of the inner rotor initiated by the first ignition source to be out of phase with a combustion process of the outer rotor initiated by the second ignition source such that a hot combustion zone of the combustion process of the inner rotor is arranged circumferentially along a cool inlet zone of the combustion process of the outer rotor during operation of the dynamic pressure exchanger.

2. The dynamic pressure exchanger of claim 1, wherein the first angular position is offset from the second angular position by about 180 degrees relative to the central axis.

3. The dynamic pressure exchanger of claim 2, wherein the double rotor assembly includes an inner tube, an intermediate tube arranged circumferentially around the inner tube, an outer tube arranged circumferentially around the intermediate tube, a plurality of axially-extending inner webs located radially between the inner and intermediate tubes to define the inner combustion cells, and a plurality of axially-extending outer webs located radially between the intermediate and outer tubes to define the outer combustion cells.

4. The dynamic pressure exchanger of claim 1, wherein the inner rotor includes an outwardly-facing first surface, an inwardly-facing second surface arranged radially-outward of the first surface to face the first surface, and a plurality of inner webs that extend radially between the first and second surfaces to define the inner combustion cells, the outer rotor includes an outwardly-facing third surface, an inwardly-facing fourth surface arranged radially-outward of the third surface to face the third surface, and a plurality of outer webs that extend radially between the third and fourth surfaces to define the outer combustion cells, and the double rotor assembly further includes a high thermal-conductivity body extending between the second and third surfaces.

5. The dynamic pressure exchanger of claim 1, further comprising an outlet plate formed to include an inner outlet port that extends circumferentially along a third arc about the central axis and an outer outlet port that extends circumferentially along a fourth arc of the central axis, the outer outlet port circumferentially offset from the inner outlet port and spaced radially further from the central axis than the inner outlet port.

6. The dynamic pressure exchanger of claim 5, wherein the first ignition source includes a first spark ignitor coupled to the outlet plate.

7. The dynamic pressure exchanger of claim 6, wherein the second ignition source includes a second spark ignitor coupled to the outlet plate.

8. The dynamic pressure exchanger of claim 7, wherein the second ignition source is offset circumferentially from the first ignition source by about 180 degrees.

9. The dynamic pressure exchanger of claim 1, wherein the first ignition source is configured to project a first flame into one of the inner combustion cells and the second ignition source is configured to project a second flame into one of the outer combustion cells during operation of the dynamic pressure exchanger.

10. A dynamic pressure exchanger comprising
an inlet plate formed to include an inner inlet port that extends circumferentially along a first arc about a central axis of the dynamic pressure exchanger and an outer inlet port that extends along a second arc about the central axis, the outer inlet port circumferentially offset from the inner inlet port, and the outer inlet port spaced radially further from the central axis than the inner inlet port,
a rotor assembly mounted for rotation relative to the inlet plate about the central axis, the rotor assembly including (i) an inner rotor formed to include a plurality of axially-extending inner combustion cells arranged circumferentially around the central axis to align with the inner inlet port when the rotor assembly rotates about the central axis and (ii) an outer rotor formed to include a plurality of axially-extending outer combustion cells arranged circumferentially around the central axis to align with the outer inlet port when the rotor assembly rotates about the central axis, and
an outlet plate formed to include an inner outlet port that extends circumferentially along a third arc about the central axis and an outer outlet port that extends circumferentially along a fourth arc of the central axis, the outer outlet port spaced radially further from the central axis than the inner outlet port,
wherein each inlet port formed in the inlet plate is circumferentially offset from any other inlet port formed in the inlet plate and each outlet port formed in the outlet plate is circumferentially offset from any other outlet port formed in the outlet plate such that each combustion processes of the inner rotor is out of phase circumferentially with each combustion process of the outer rotor to cause each cool inlet zone of the inner rotor to be arranged circumferentially along each hot combustion zone of the outer rotor during operation of the dynamic pressure exchanger.

11. The dynamic pressure exchanger of claim 10, further comprising an ignition system configured to ignite a first fuel mixture in one of the plurality of inner combustion cells when the one of the plurality of inner combustion cells is aligned with a first angular position relative to the central axis and to ignite a second fuel mixture in one of the plurality of outer combustion cells when the one of the plurality of outer combustion cells is aligned with a second angular position circumferentially offset from the first angular position.

12. The dynamic pressure exchanger of claim 11, wherein the second angular position is spaced apart circumferentially from the first angular position by about 180 degrees relative to the central axis.

13. The dynamic pressure exchanger of claim 11, wherein the ignition system includes a first ignition source including a first spark ignitor coupled to the outlet plate.

14. The dynamic pressure exchanger of claim 13, wherein the ignition system includes a second ignition source including a second spark ignitor coupled to the outlet plate.

15. The dynamic pressure exchanger of claim 10, wherein the rotor assembly includes an inner tube, an intermediate tube arranged circumferentially around the inner tube, an outer tube arranged circumferentially around the intermediate tube, a plurality of axially-extending inner webs extending radially between the inner and intermediate tubes to define the inner combustion cells, and a plurality of axially-extending outer webs extending radially between the intermediate and outer tubes to define the outer combustion cells.

16. A method of operating a dynamic pressure exchanger, the method comprising
rotating a rotor assembly about a central axis of the dynamic pressure exchanger relative to an inlet plate formed to include an inner inlet port and an outer inlet port circumferentially offset from the inner inlet port and spaced radially further from the central axis than the inner inlet port, the rotor assembly including (i) an inner rotor formed to include a plurality of inner combustion cells and (ii) an outer rotor arranged circumferentially around the inner rotor and formed to include a plurality of outer combustion cells,
conducting a first fuel mixture into the inner combustion cells through the inner inlet port to provide an inner cool inlet zone,
conducting a second fuel mixture into the outer combustion cells through the outer inlet port to provide an outer cool inlet zone,
igniting the first fuel mixture in one of the inner combustion cells at a first angular position relative to the central axis to provide an inner hot combustion zone, and
igniting the second fuel mixture in one of the outer combustion cells at a second angular position offset from the first angular position relative to the central axis to provide an outer hot combustion zone,
wherein each inlet port is at least partially misaligned circumferentially from any other inlet port such that the inner hot combustion zone is at least partially aligned circumferentially with the outer cool inlet zone and the outer hot combustion zone is at least partially aligned circumferentially with the inner cool inlet zone.

17. The method of claim 16, wherein the second angular position is circumferentially offset from the first angular position by about 180 degrees.

18. The method of claim 16, wherein the rotor assembly includes an inner tube, an intermediate tube arranged circumferentially around the inner tube, an outer tube arranged circumferentially around the intermediate tube, a plurality of axially-extending inner webs located between the inner and intermediate tubes to define the inner combustion cells, and a plurality of axially-extending outer webs located radially between the intermediate and outer tubes to define the outer combustion cells.

\* \* \* \* \*